(12) United States Patent
Saint-Pierre

(10) Patent No.: US 8,098,506 B2
(45) Date of Patent: Jan. 17, 2012

(54) SINGLE-STAGE POWER SUPPLY WITH POWER FACTOR CORRECTION AND CONSTANT CURRENT OUTPUT

(75) Inventor: Roland S. Saint-Pierre, San Jose, CA (US)

(73) Assignee: Power Integrations, Inc., San Jose, CA (US)

( * ) Notice: Subject to any disclaimer, the term of this patent is extended or adjusted under 35 U.S.C. 154(b) by 413 days.

(21) Appl. No.: 12/477,010

(22) Filed: Jun. 2, 2009

(65) Prior Publication Data
US 2010/0302811 A1    Dec. 2, 2010

(51) Int. Cl.
*H02M 7/44*    (2006.01)
(52) U.S. Cl. ........................... 363/97; 363/21.12
(58) Field of Classification Search ........ 363/20, 363/21.01, 21.12, 56.01, 78, 95, 97, 131
See application file for complete search history.

(56) References Cited

U.S. PATENT DOCUMENTS

| | | | |
|---|---|---|---|
| 4,357,572 A | 11/1982 | Andersen et al. | |
| 4,816,982 A | 3/1989 | Severinsky | |
| 5,479,090 A | 12/1995 | Schultz | |
| 5,804,950 A | 9/1998 | Hwang et al. | |
| 6,178,104 B1 | 1/2001 | Choi | |
| 6,188,588 B1 * | 2/2001 | Hemena et al. | 363/21.18 |
| 6,191,676 B1 | 2/2001 | Gabor | |
| 6,448,744 B1 | 9/2002 | Malik et al. | |
| 6,900,995 B2 | 5/2005 | Muegge et al. | |
| 6,977,824 B1 | 12/2005 | Yang et al. | |
| 7,016,204 B2 | 3/2006 | Yang et al. | |
| 7,054,170 B2 | 5/2006 | Yang et al. | |
| 7,061,225 B2 | 6/2006 | Yang et al. | |
| 7,061,780 B2 | 6/2006 | Yang et al. | |
| 7,259,972 B2 | 8/2007 | Yang | |
| 7,345,464 B2 | 3/2008 | Steele | |
| 7,352,595 B2 | 4/2008 | Yang et al. | |
| 7,391,631 B2 | 6/2008 | Shimada | |
| 7,405,954 B2 * | 7/2008 | Baurle et al. | 363/21.12 |

(Continued)

FOREIGN PATENT DOCUMENTS
WO    WO 2005/043732 A1    5/2005

OTHER PUBLICATIONS

U.S. Appl. No. 12/049,098, filed Mar. 14, 2008, Saint-Pierre.

(Continued)

*Primary Examiner* — Adolf Berhane
(74) *Attorney, Agent, or Firm* — Blakely Sokoloff Taylor & Zafman LLP

(57) ABSTRACT

An example controller includes first, second and third inputs, a delayed ramp generator and a drive signal generator. The first, second and third inputs are coupled to receive an input voltage sense signal, an output voltage sense signal, and an input current sense signal, respectively. The drive signal generator is coupled to receive an input charge control signal generated by an input charge control signal generator and a delayed ramp signal generated by a delayed ramp generator. The input charge control signal is generated responsive to an integral of the input current sense signal multiplied by a ratio of the input voltage sense signal to the output voltage sense signal, where the drive signal generator produces a drive signal responsive to the input charge control signal and the delayed ramp signal, the drive signal to be coupled to control a switch of a power supply to regulate an output of the power supply.

24 Claims, 6 Drawing Sheets

U.S. PATENT DOCUMENTS

| | | | |
|---|---|---|---|
| RE40,656 E | 3/2009 | Yang et al. | |
| 7,518,889 B2 * | 4/2009 | Baurle et al. | 363/21.12 |
| 7,714,554 B2 | 5/2010 | Jacques et al. | |
| 7,746,050 B2 * | 6/2010 | Djenguerian et al. | 323/299 |
| 7,859,865 B2 * | 12/2010 | Baurle et al. | 363/21.12 |
| 2006/0221650 A1 * | 10/2006 | Yamada | 363/21.01 |
| 2007/0008753 A1 * | 1/2007 | Kroes | 363/56.01 |
| 2007/0217231 A1 * | 9/2007 | Ishii et al. | 363/21.01 |
| 2007/0217232 A1 * | 9/2007 | Djenguerian et al. | 363/21.01 |
| 2008/0192514 A1 | 8/2008 | Zhou et al. | |
| 2008/0232141 A1 * | 9/2008 | Artusi et al. | 363/21.01 |
| 2009/0196081 A1 * | 8/2009 | Chen et al. | 363/78 |
| 2010/0194198 A1 * | 8/2010 | Djenguerian et al. | 307/31 |

OTHER PUBLICATIONS

U.S. Appl. No. 12/477,058, filed Jun. 2, 2009, Kung et al.

U.S. Appl. No. 12/477,052, filed Jun. 2, 2009, Liu et al.

Tang, Wei et al., "Change Control: Modeling, Analysis and Design", IEEE Transactions on Power Electronics, Oct. 1993, pp. 396-403, vol. 8, No. 4.

* cited by examiner

SINGLE-STAGE POWER SUPPLY WITH POWER FACTOR CORRECTION AND CONSTANT CURRENT OUTPUT

BACKGROUND INFORMATION

1. Field of the Disclosure

The present invention relates generally to power supplies, and more specifically, the invention relates to control circuits to regulate an output of a power supply.

2. Background

In a typical switched-mode power supply application, the ac-dc power supply receives an input that is between 100 and 240 volts rms (root mean square) from an ordinary ac electrical outlet. Switches in the power supply are switched on and off by a control circuit to provide a regulated output that may be suitable for providing current to, for example, light emitting diodes (LEDs) for illumination. The regulated output is typically a regulated dc current, and the voltage at the LEDs is typically less than 40 volts.

An ac-dc power supply that provides regulated current to LEDs typically must meet requirements for power factor, galvanic isolation, and efficiency, as explained below. Designers are challenged to provide satisfactory solutions at the lowest cost.

The electrical outlet provides an ac voltage that has a waveform conforming to standards of magnitude, frequency, and harmonic content. The current drawn from the outlet, however, is determined by the characteristics of the power supply that receives the ac voltage. In many applications, regulatory agencies set standards for particular characteristics of the current that may be drawn from the ac electrical outlet. For example, a standard may set limits on the magnitudes of specific frequency components of the ac current. In another example, a standard may limit the rms value of the current in accordance with the amount of power that the outlet provides. Power in this context is the rate at which energy is consumed, typically measured in the units of watts.

The general goal of all such standards for the ac current is to reduce the burden on the system that distributes ac power, sometimes called the power grid. Components of the current at frequencies other than the fundamental frequency of the ac voltage, sometimes called harmonic components, do no useful work, but yet the power grid must have the capacity to provide them and it must endure losses associated with them. Harmonic components generally distort the ideal current waveform so that it has a much higher maximum value than is necessary to deliver the required power. If the power grid does not have the capacity to provide the harmonic components, the waveform of the voltage will droop to an unacceptable value at times that are coincident with the peaks of the distorted waveform of the current. The most desirable ac current has a single frequency component that is at the fundamental frequency of the ac voltage. The ideal current will have an rms value that is equal to the value of the power from the outlet divided by the rms value of the voltage. In other words, the product of the rms voltage and the rms current will be equal to the power from the outlet when the current has ideal characteristics.

Power factor is a measure of how closely the ac current approaches the ideal. The power factor is simply the power from the outlet divided by the product of the rms current multiplied by the rms voltage. A power factor of 100% is ideal. Currents that have frequency components other than the fundamental frequency of the ac voltage will yield a power factor less than 100% because such components increase the rms value but they do not contribute to the output power. The fundamental frequency of the ac voltage is typically either 50 Hz or 60 Hz in different regions of the world. By way of example, the fundamental frequency of the ac voltage is nominally 60 Hz in North America and Taiwan, but it is 50 Hz in Europe and China.

Since the power supply that receives the ac voltage determines the characteristics of the ac current, power supplies often use special active circuits at their inputs to maintain a high power factor. Power supplies that use only ordinary passive rectifier circuits at their inputs typically have low power factors that in some examples are less than 50%, whereas a power factor substantially greater than 90% is typically required to meet the standards for input current, such as for example the International Electrotechnical Commission (IEC) standard IED 61000-3-2. Although regulatory agencies in some regions may impose the standards, manufacturers of consumer equipment often voluntarily design their products to meet or to exceed standards for power factor to achieve a competitive advantage. Therefore, ac-dc power supplies for LEDs, for example, typically must include power factor correction.

Safety agencies generally require the power supply to provide galvanic isolation between input and output. Galvanic isolation prevents dc current from flowing between input and output of the power supply. In other words, a high dc voltage applied between an input terminal and an output terminal of a power supply with galvanic isolation will produce no dc current between the input terminal and the output terminal of the power supply. The requirement for galvanic isolation is a complication that contributes to the cost of the power supply.

A power supply with galvanic isolation must maintain an isolation barrier that electrically separates the input from the output. Energy must be transferred across the isolation barrier to provide power to the output, and information in the form of feedback signals in many cases is transferred across the isolation barrier to regulate the output. Galvanic isolation is typically achieved with electromagnetic and electro-optical devices. Electromagnetic devices such as transformers and coupled inductors are generally used to transfer energy between input and output to provide output power, whereas electro-optical devices are generally used to transfer signals between output and input to control the transfer of energy between input and output.

A common solution to provide high power factor for an ac-dc power supply with galvanic isolation uses two stages of power conversion: One stage without galvanic isolation shapes the ac input current to maintain a high power factor, providing an intermediate output to a second stage of power conversion that has galvanic isolation with control circuitry to regulate a final output. The use of more than one stage of power conversion increases the cost and complexity of the system.

Efforts to reduce the cost of the power supply have focused on the elimination of electro-optical devices and their associated circuits. Alternative solutions generally use a single energy transfer element with multiple windings such as, for example, a transformer or, for example, a coupled inductor to provide energy to the output and also to obtain the information necessary to control the output. The lowest cost configuration typically places the control circuit and a high voltage switch on the input side of the isolation barrier. The controller obtains information about the output indirectly from observation of a voltage at a winding of the energy transfer element. The winding that provides the information is also on the input side of the isolation barrier. To reduce cost and complexity further, the controller can also use the same winding of the energy transfer element to provide energy to the controller and also obtain information about the input to the power supply.

The input side of the isolation barrier is sometimes referred to as the primary side, and the output side of the isolation barrier is sometimes referred to as the secondary side. Windings of the energy transfer element that are not galvanically isolated from the primary side are also primary side windings, sometimes called primary referenced windings. A winding on the primary side that is coupled to an input voltage and receives energy from the input voltage is sometimes referred to simply as the primary winding. Other primary referenced windings that deliver energy to circuits on the primary side may have names that describe their principal function, such as for example a bias winding, or for example a sense winding. Windings that are galvanically isolated from the primary side windings are secondary side windings, sometimes called output windings.

While it is quite straightforward to use a winding on the input side of the isolation barrier to obtain information indirectly about a galvanically isolated output voltage, it is a different challenge to obtain information indirectly about a galvanically isolated output current. In many power supply topologies, the measurement of a current in an input winding alone is not sufficient to determine an output current. Conventional solutions for measuring an output current usually include a current to voltage conversion that wastes power and uses costly components to transmit a signal across the isolation barrier. Therefore, conventional solutions are not satisfactory to meet the goals of galvanic isolation with high efficiency and high power factor at low cost in an ac-dc converter.

BRIEF DESCRIPTION OF THE DRAWINGS

Non-limiting and non-exhaustive embodiments and examples of the present invention are described with reference to the following figures, wherein like reference numerals refer to like parts throughout the various views unless otherwise specified.

DETAILED DESCRIPTION

In the following description, numerous specific details are set forth in order to provide a thorough understanding of the present invention. It will be apparent, however, to one having ordinary skill in the art that the specific detail need not be employed to practice the present invention. In other instances, well-known materials or methods have not been described in detail in order to avoid obscuring the present invention.

Reference throughout this specification to "one embodiment", "an embodiment", "one example" or "an example" means that a particular feature, structure or characteristic described in connection with the embodiment or example is included in at least one embodiment of the present invention. Thus, appearances of the phrases "in one embodiment", "in an embodiment", "one example" or "an example" in various places throughout this specification are not necessarily all referring to the same embodiment or example. Furthermore, the particular features, structures or characteristics may be combined in any suitable combinations and/or subcombinations in one or more embodiments or examples. In addition, it is appreciated that the figures provided herewith are for explanation purposes to persons ordinarily skilled in the art and that the drawings are not necessarily drawn to scale.

Figure 1:
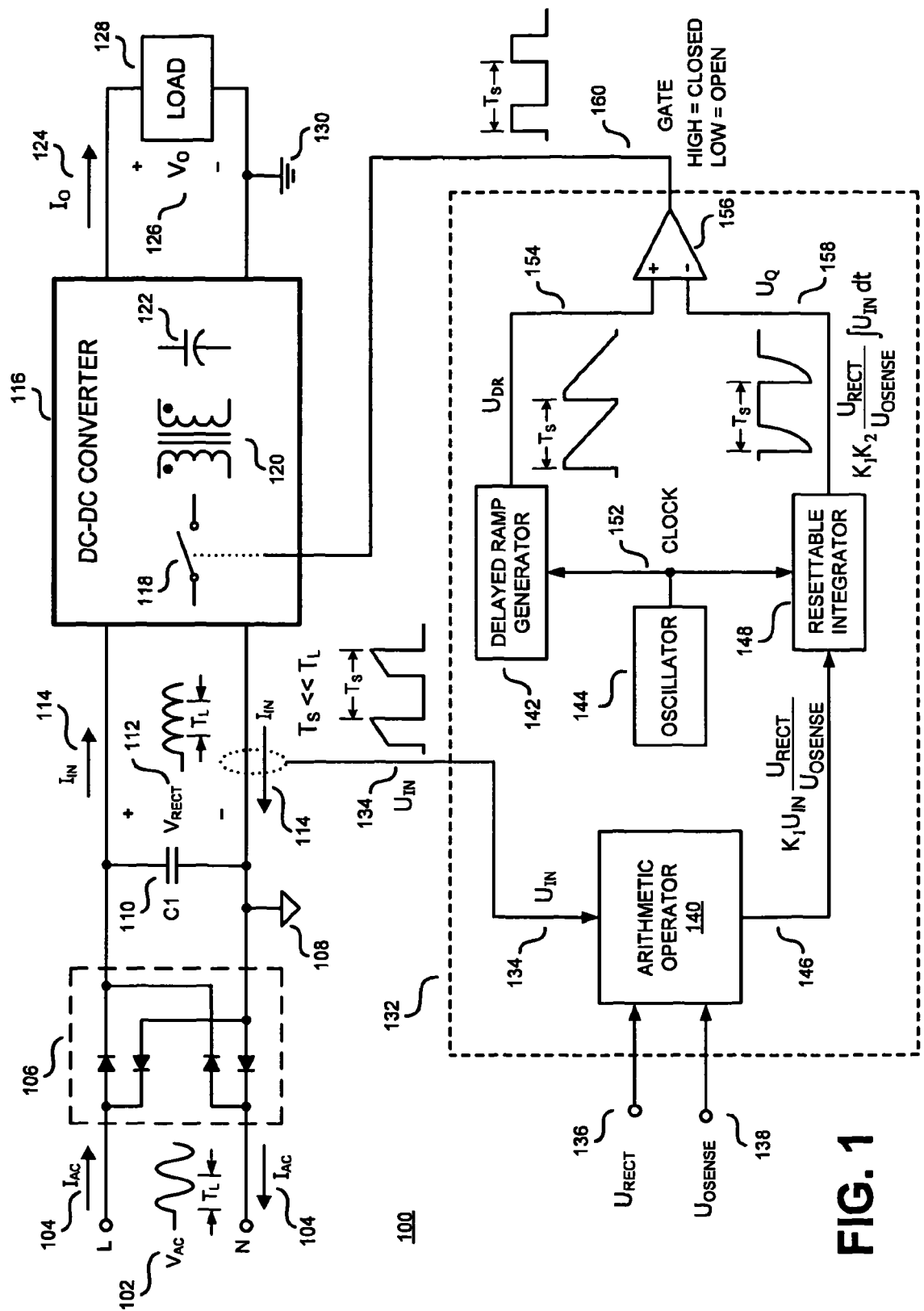
FIG. 1 is a functional block diagram of an ac-dc power supply including a controller for maintaining a high power factor while regulating an output current, in accordance with the teachings of the present invention.

The functional block diagram of FIG. 1 shows one example of an ac-dc power supply 100 receiving an ac input voltage $V_{AC}$ 102 that has a substantially sinusoidal waveform with a period $T_L$ that is the ac line period. The example power supply 100 of FIG. 1 has an ac input current $I_{AC}$ 104.

In the example power supply of FIG. 1, a full wave bridge rectifier 106 produces a dc rectified voltage $V_{RECT}$ 112 that is received by a dc-dc converter 116. Rectified voltage $V_{RECT}$ 112 is positive with respect to an input return 108. Dc-dc converter 116 has an input current $I_{IN}$ 114 that has a pulsating waveform with a period $T_S$ that is the switching period. The switching period $T_S$ is much less than the ac line period $T_L$. The switching period $T_S$ is the reciprocal of the switching frequency, and the ac line period $T_L$ is the reciprocal of the ac line frequency. In one example, the switching period $T_S$ is about 15 microseconds whereas the ac line period $T_L$ is about 20 milliseconds. In other words, the ac line period $T_L$ is typically about 1000 times greater than the switching period $T_S$, so that there are typically about 1000 switching periods within one ac line period.

In the example power supply of FIG. 1, a small capacitor C1 110 coupled across the dc terminals of bridge rectifier 106 provides a low impedance source for the pulses of input current $I_{IN}$ 114. Capacitor C1 110 filters the high frequency components of input current $I_{IN}$ 114 such that the magnitude of the ac input current $I_{AC}$ 104 at any instant is substantially the average of the dc input current $I_{IN}$ 114, the average taken over a switching period $T_S$. Capacitor C1 110 is small enough to allow the rectified voltage $V_{RECT}$ 112 to become substantially zero twice in every ac line period $T_L$.

Dc-dc converter 116 in the example of FIG. 1 is controlled by a controller 132 to regulate a substantially dc output current $I_O$ 124 that produces an output voltage $V_O$ 126 at a load 128. Output voltage $V_O$ 126 is positive with respect to an output return 130. In one example, load 128 is an arrangement of LEDs.

Dc-dc converter 116 typically includes at least one switch 118, at least one coupled inductor 120, and at least one capacitor 122. All standard converter configurations with pulsating input currents that are typically used to provide galvanically isolated outputs, such as for example the flyback converter and for example the many variants of the buck converter may be realized by an arrangement of switches, coupled inductors, and capacitors represented by the dc-dc converter block 116 in the example of FIG. 1.

The various components identified with the functions of the dc-dc converter 116 and the controller 132 need not be confined to the boundaries suggested by the boxes drawn in the example power supply 100 of FIG. 1. The individual components are segregated into easily identifiable regions in this disclosure to aid the explanation of the invention. Therefore, for example, a component such as switch 118 may still be considered an element of dc-dc converter 116 when switch 118 is physically located with circuits associated with a different function. For example, switch 118 may be packaged together with bridge rectifier 106, or switch 118 may be included with circuits of controller 132 in an integrated circuit that is manufactured as either a hybrid or a monolithic integrated circuit.

In the example of FIG. 1, controller 132 receives input current sense signal $U_{IN}$ 134 that is representative of the dc input current $I_{IN}$ 114. Controller 132 also receives an input voltage sense signal $U_{RECT}$ 136 that is representative of the rectified input voltage $V_{RECT}$ 112. Controller 132 also receives an output voltage sense signal $U_{OSENSE}$ that is representative of the output voltage $V_O$ 126.

Embodiments described in this disclosure may use many techniques to sense the input current $I_{IN}$ 114 as the current sense signal $U_{IN}$ 134. For example, the input current may be sensed as a voltage on a discrete resistor, or a current from a current transformer, or a voltage across the on-resistance of a metal oxide semiconductor field effect transistor (MOSFET) when the input current is the same as the current in the transistor, or as a current from the sense output of a current sensing field effect transistor (senseFET). Therefore, this disclosure will omit specific examples of techniques to sense dc input current $I_{IN}$ 114.

In the example of FIG. 1, a switch 118 included in dc-dc converter 116 is responsive to a drive signal 160 received from controller 132. In the example of FIG. 1, drive signal 160 is a logic signal that may be high or low within a switching period $T_S$. In one example, switch 118 is closed when drive signal 160 is high, and switch 118 is open when drive signal 160 is low. A closed switch is sometimes referred to as being in an on state. An open switched is sometimes referred to as being in an off state. In other words, a switch that turns on closes, and a switch that turns off opens. In the example of FIG. 1, the dc input current $I_{IN}$ 114 is a pulsating current that is substantially zero when drive signal 160 is low.

It is appreciated that input current sense signal $U_{IN}$ 134, input voltage sense signal $U_{RECT}$ 136, and output voltage sense signal $U_{OSENSE}$ 138 may be any signals that have a known relationship to the dc input current $I_{IN}$ 114, the rectified input voltage $V_{RECT}$ 112, and the output voltage $V_O$ 126, respectively. For example, a voltage may be sensed as a current signal, and a current may be sensed as a voltage signal.

Controller 132 includes an oscillator 144 that provides timing signals such as for example a clock signal 152 that sets the duration of the switching period $T_S$, and also may provide other timing signals not shown in FIG. 1. An arithmetic operator circuit 140 receives input current sense signal $U_{IN}$ 134, input voltage sense signal $U_{RECT}$ 136, and output voltage sense signal $U_{OSENSE}$ 138 to produce a scaled current signal 146 that is the product of input current sense signal $U_{IN}$ 134 multiplied by the ratio of the input voltage sense signal $U_{RECT}$ 136 to the output voltage sense signal $U_{OSENSE}$ 138, and multiplied again by a constant scaling factor $K_1$.

Controller 132 also includes a resettable integrator 148. Resettable integrator 148 integrates the scaled current signal 146 to produce the input charge control signal $U_Q$ 158. Thus, the arithmetic operator circuit 140 and resettable integrator 148 comprise an input charge control signal generator. Input charge control signal $U_Q$ 158 is directly proportional to the electrical charge received by dc-dc converter 116 during a switching period. Input charge control signal $U_Q$ 158 may be scaled by an additional constant scaling factor $K_2$. In the example of FIG. 1, resettable integrator 148 receives clock signal 152 to reset the integrator and to initiate integration.

In one example, a resettable integrator 148 may include a capacitor, a current source, and a switch. The current source, with a value representative of the signal to be integrated, charges the capacitor during the time of integration. The switch discharges the capacitor when the integrator is reset. Other examples of resettable integrator 148 may include features of greater sophistication, including resetting the integrator to a known value that is not necessarily zero, such that the charging of the capacitor during the time of integration occurs in a linear operating range of the capacitor. In another example, resettable integrator 148 may be a two-way integrator. That is, resettable integrator 148 may integrate by charging a capacitor during one switching period $T_S$ and may then integrate by discharging the capacitor in a subsequent switching period. Such a two-way integrator may be useful in applications in which a high maximum duty ratio (e.g., 99%-100%) is desired for drive signal 160

In the example of FIG. 1, a delayed ramp generator 142 included in controller 132 provides a delayed ramp signal $U_{DR}$ 154. Delayed ramp signal $U_{DR}$ 154 is typically a signal that includes piecewise linear segments with characteristics chosen to achieve a desired power factor from a particular dc-dc converter. For a flyback converter, for example, the waveform of delayed ramp signal $U_{DR}$ 154 may have a short horizontal segment of a magnitude greater than zero at the beginning of the switching period followed by a much longer segment that decreases to zero at a constant slope before the next switching period. For a buck converter, for example, the waveform of delayed ramp signal $U_{DR}$ 154 may have two linearly decreasing segments at different slopes following the short horizontal segment. In one example, delayed ramp signal $U_{DR}$ 154 includes a first segment of substantially zero slope followed by a second segment having a finite linear slope. The generation of the delayed ramp signal is typically accomplished by summing portions of triangular waveforms that are either generated for this purpose or are readily available from other circuits in the controller.

A drive signal generator (i.e., comparator 156) in controller 132 of the example of FIG. 1 compares input charge control signal $U_Q$ 158 with delayed ramp signal $U_{DR}$ 154 to produce drive signal 160. In one example, drive signal 160 is at a high state when input charge control signal $U_Q$ 158 is less than delayed ramp signal $U_{DR}$ 154 and drive signal 160 is at a low state when input charge control signal $U_Q$ 158 is greater than delayed ramp signal $U_{DR}$ 154.

Figure 2:
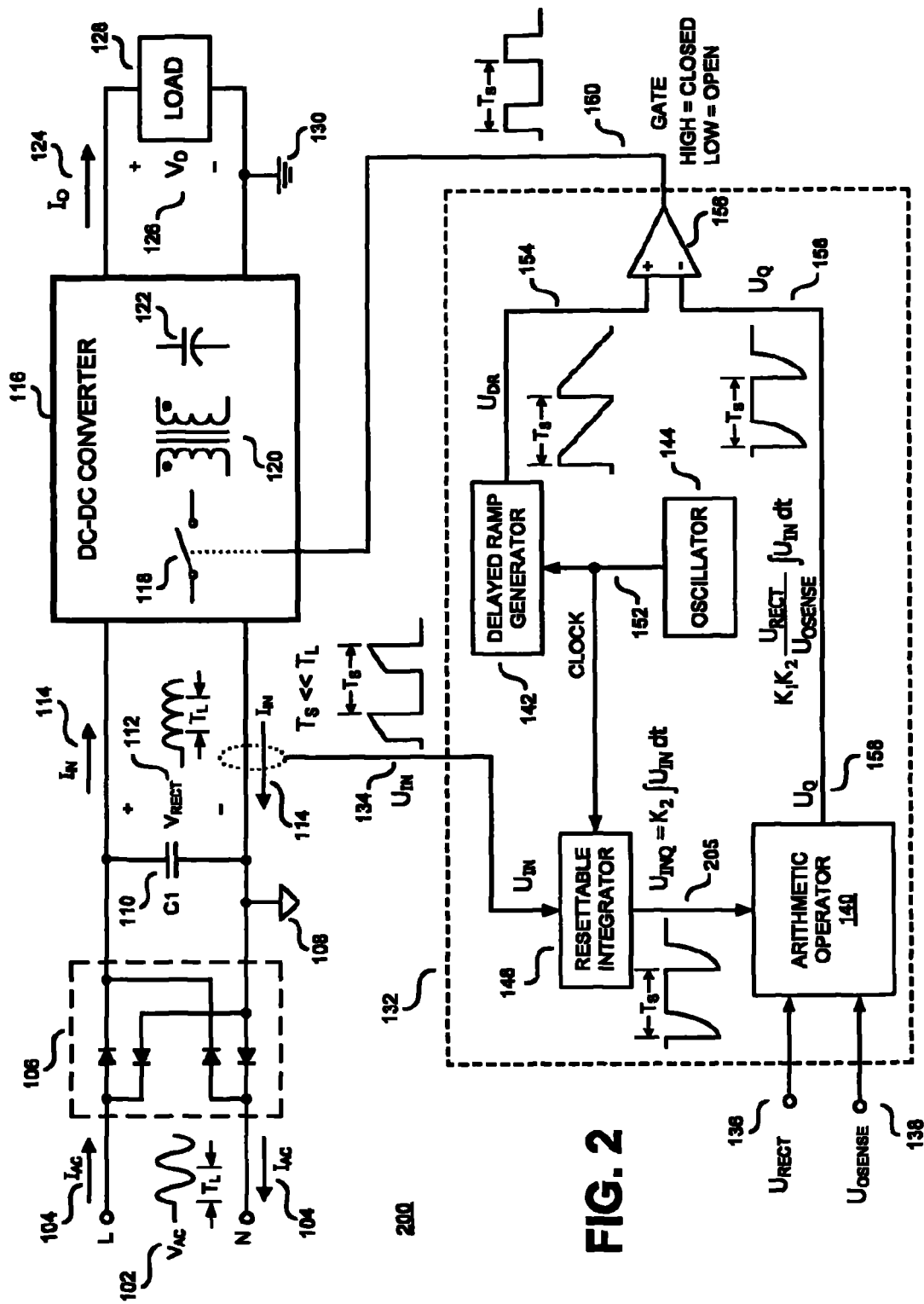
FIG. 2 is a functional block diagram of an ac-dc power supply including an alternative controller for maintaining a high power factor while regulating an output current, in accordance with the teachings of the present invention.

Functional blocks within controller 132 in the example of FIG. 1 may be arranged differently to operate on signals in a different order to produce the same result, as shown in the example of FIG. 2. FIG. 2 shows an alternative arrangement of functions within controller 132. In the example of FIG. 2, input current sense signal $U_{IN}$ 134 is first integrated and scaled by resettable integrator 148 to produce an input charge signal $U_{INQ}$ 205. Then, arithmetic operator circuit 140 receives input charge signal $U_{INQ}$ 205 to produce the input charge control signal $U_Q$ 158 that is compared to delayed ramp signal $U_{DR}$ 154 by comparator 156 as in the example of FIG. 1.

Individual signals within controller 132 in the examples of FIG. 1 and FIG. 2 may also be combined and arranged differently to produce the same result. For example, in an alternative arrangement to the direct comparison of delayed ramp signal $U_{DR}$ 154 with input charge control signal $U_Q$ 158, delayed ramp signal $U_{DR}$ 154 may be subtracted from input charge control signal $U_Q$ 158, and the difference compared to a constant level. Mathematically, this alternative just subtracts the same signal (delayed ramp signal $U_{DR}$ 154) from both inputs of comparator 156.

Figure 3:
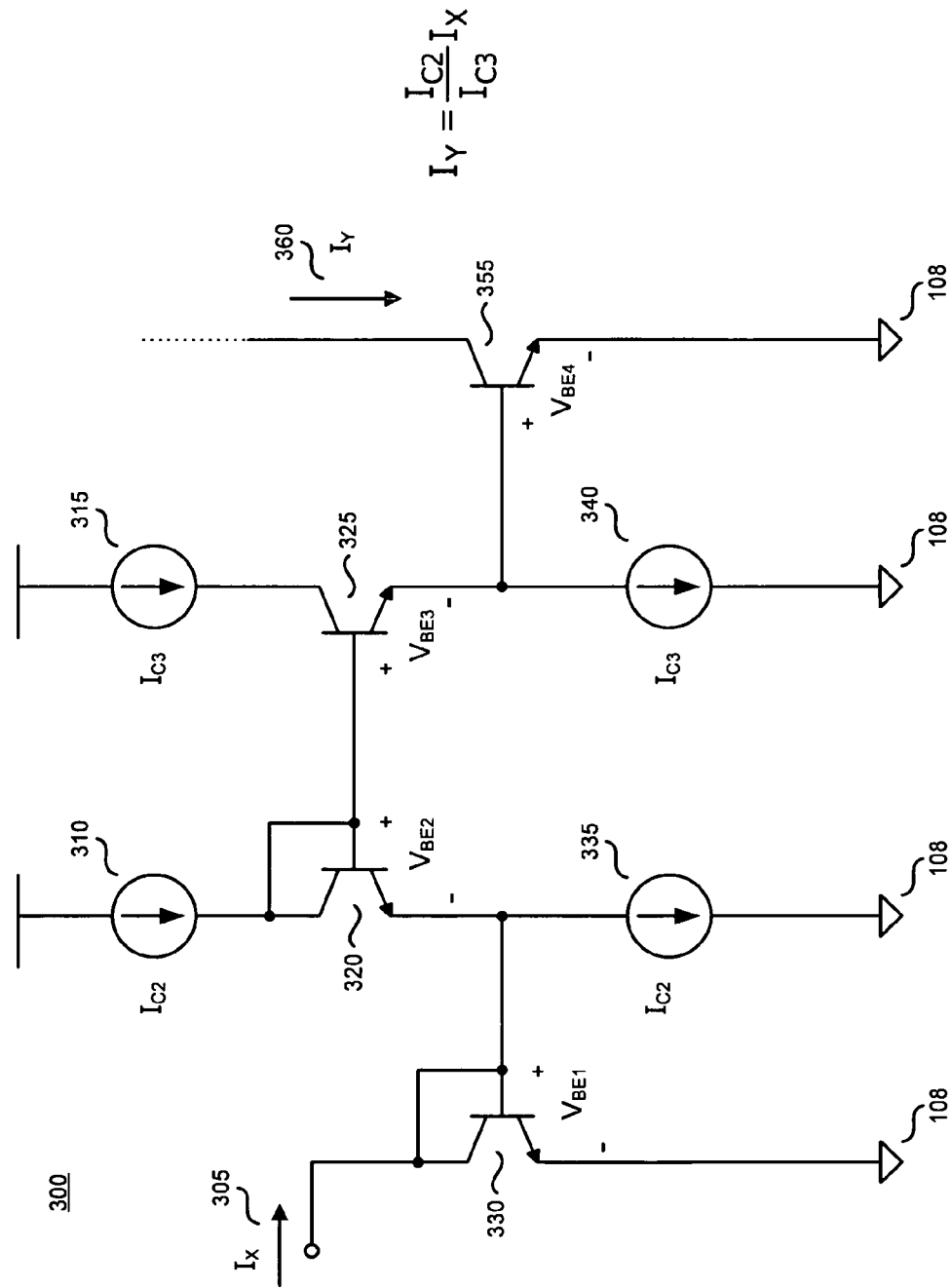
FIG. 3 is a schematic diagram illustrating an example arithmetic operator circuit, in accordance with the teaching of the present invention.

FIG. 3 shows an example circuit 300 that may perform the functions of the arithmetic operator circuit of FIG. 1 and FIG. 2.

In the circuit of FIG. 3, bipolar NPN transistors 330, 320, 325, and 355 are matched. To a very good approximation, the base to emitter voltage of a bipolar transistor is directly proportional to the natural logarithm of the collector current. That is, for practical values in the region of interest, $$V_{BE} \approx V_T \ln\left(\frac{I_C}{I_S}\right) \qquad \text{EQ. 1}$$

where $V_{BE}$ is the base to emitter voltage, $V_T$ is the thermal voltage fixed by physical constants, $I_C$ is the collector current, and $I_S$ is the reverse saturation current of the base to emitter junction of the transistor. For the circuit in FIG. 3, $$V_{BE1}+V_{BE2}=V_{BE3}+V_{BE4} \qquad \text{EQ. 2}$$

Therefore, under the condition that the base current of all the transistors is negligible, the relationship of Equation (1) requires that the currents $I_X$ 305 and $I_Y$ 360 are related by the expression $$I_Y = \frac{I_{C2}}{I_{C3}} I_X \qquad \text{EQ. 3}$$

In other words, application of the logarithmic relationship of Equation (1) to the circuit of FIG. 3 shows that the input current $I_X$ 305 is multiplied by the value $I_{C2}$ of current sources 310 and 335. It can also be shown that the input current $I_X$ 305 is divided by the value $I_{C3}$ of the current sources 315 and 340. Therefore, multiplication of two signals may be achieved by the circuit in FIG. 3 when $I_X$ 305 is proportional to a first signal while current sources 310 and 335 are proportional to a second signal. Multiplication by the reciprocal of a third signal may be achieved when the current sources 315 and 340 are proportional to the third signal. Many suitable variants of the example circuit of FIG. 3 are known in the art.

In one example, current sources $I_{C2}$ 310 and 335 are variable current sources controlled by the input voltage sense signal $U_{RECT}$ 136, while current sources $I_{C3}$ 315 and 340 are variable current sources controlled by the output voltage sense signal $U_{OSENSE}$. Thus, with input current $I_X$ directly proportional to the input charge sense signal $U_{INQ}$ 205, output current $I_Y$ is representative of input charge control signal $U_Q$ 158 according to the example of FIG. 2.

Figure 4:
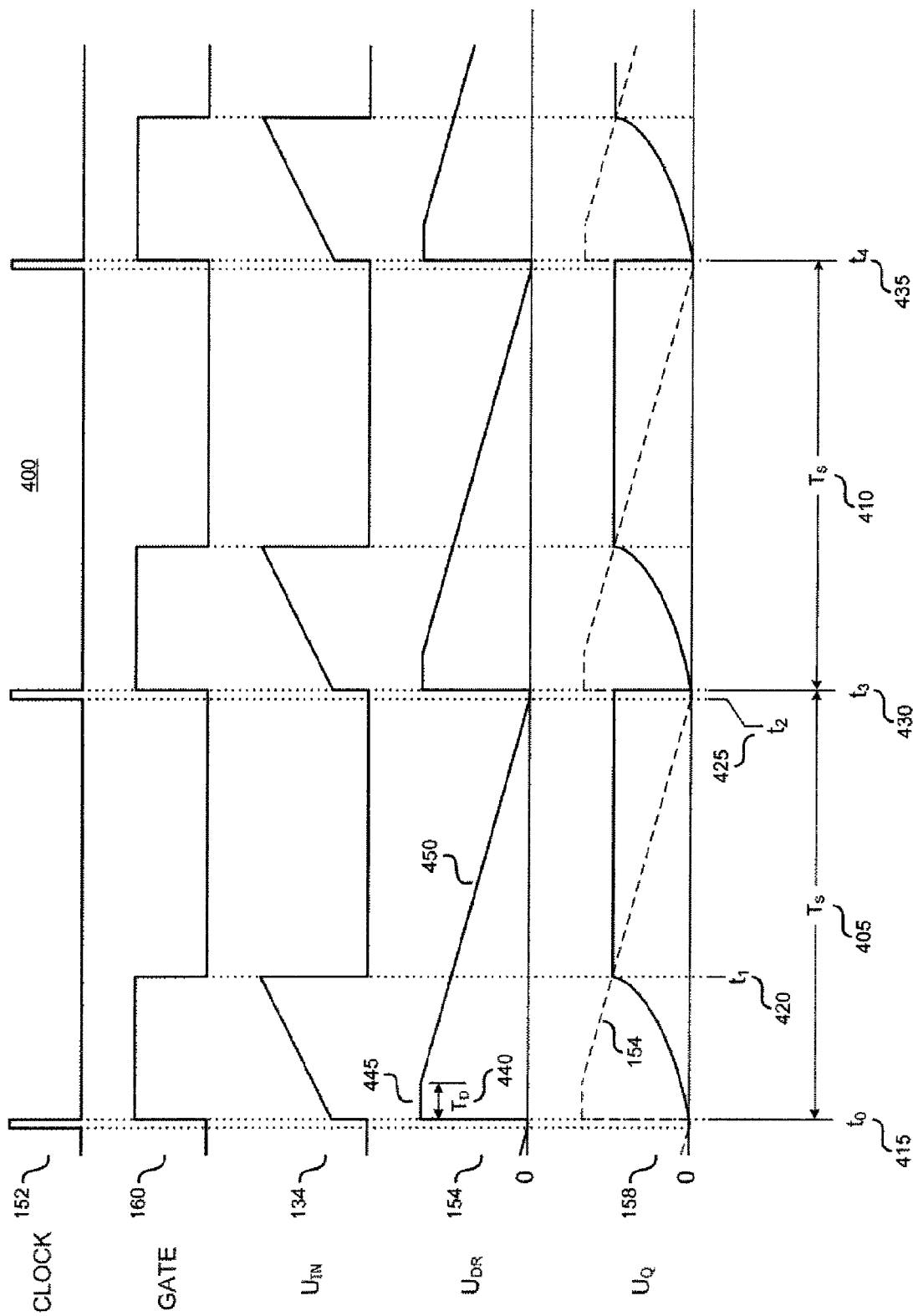
FIG. 4 is a timing diagram that shows waveforms of signals from the circuits of FIG. 1 and FIG. 2.

FIG. 4 is a timing diagram 400 of signals in the controller 132 of FIG. 1 and FIG. 2 for two complete switching periods 405 and 410. A convenient reference signal for timing purposes is the clock signal 152. In the example timing diagram 400, the falling edge of clock signal 154 marks the switching periods. For example, switching period 405 starts at time $t_0$ 415 and ends at time $t_3$ 430, whereas switching period 410 starts at time $t_3$ 430 and ends at time $t_4$ 435.

In the example timing diagram 400 of FIG. 4, drive signal ("GATE") 160 goes high at the beginning of switching period 405 to close a switch 118 in dc-dc converter 116. Dc-dc converter 116 may receive dc input current $I_{IN}$ 114 while switch 118 is closed. Timing diagram 400 shows delayed ramp signal $U_{DR}$ 154 at a constant positive value for a delay time $T_D$ 440 after the start of switching period 405, then decreasing linearly to zero at time $t_2$ 425 at the rising edge of clock signal 152. As shown in FIG. 4, delayed ramp signal $U_{DR}$ 154 includes a first segment 445 of substantially zero slope followed by a second segment 450 having a finite linear slope.

In the example of FIG. 4, the falling edge of clock signal 152 resets resettable integrator 148 at times $t_0$ 415, $t_3$ 430, and $t_4$ 435, to bring input charge control signal $U_Q$ 158 to a value of zero. Dc-dc converter 116 receives dc input current $I_{IN}$ 114 when drive signal 160 is high, as indicted by input current sense signal $U_{IN}$ 134. Input charge control signal $U_Q$ 158 increases as resettable integrator integrates input current sense signal $U_{IN}$ 134.

The example timing diagram 400 shows that drive signal 160 remains high when input charge control signal $U_Q$ 158 is less than delayed ramp signal $U_{DR}$ 154. Drive signal 160 goes low in FIG. 4 after input charge control signal $U_Q$ 158 becomes equal to the value of delayed ramp signal $U_{DR}$ 154. In other words, switch 118 is closed from time $t_0$ 415 at the beginning of switching period $T_S$ 405 until input charge control signal $U_Q$ 118 rises to reach the value of delayed ramp signal $U_{DR}$ 154 at time $t_1$ 420. When input charge control signal $U_Q$ reaches the value of delayed ramp signal $U_{DR}$ 154 at time $t_1$ 420, switch 118 opens for the remainder of the switching period $T_S$ 405.

Since delayed ramp signal $U_{DR}$ 154 is decreasing at time $t_1$ 420, input charge signal $U_Q$ 158 becomes greater than delayed ramp signal $U_{DR}$ 154 between time $t_1$ 420 and the end of switching period $T_S$ 405. Therefore, controller 132 opens switch 118 when the value of input charge signal $U_Q$ 158 becomes greater than the value of delayed ramp signal $U_{DR}$ 154.

Figure 5:
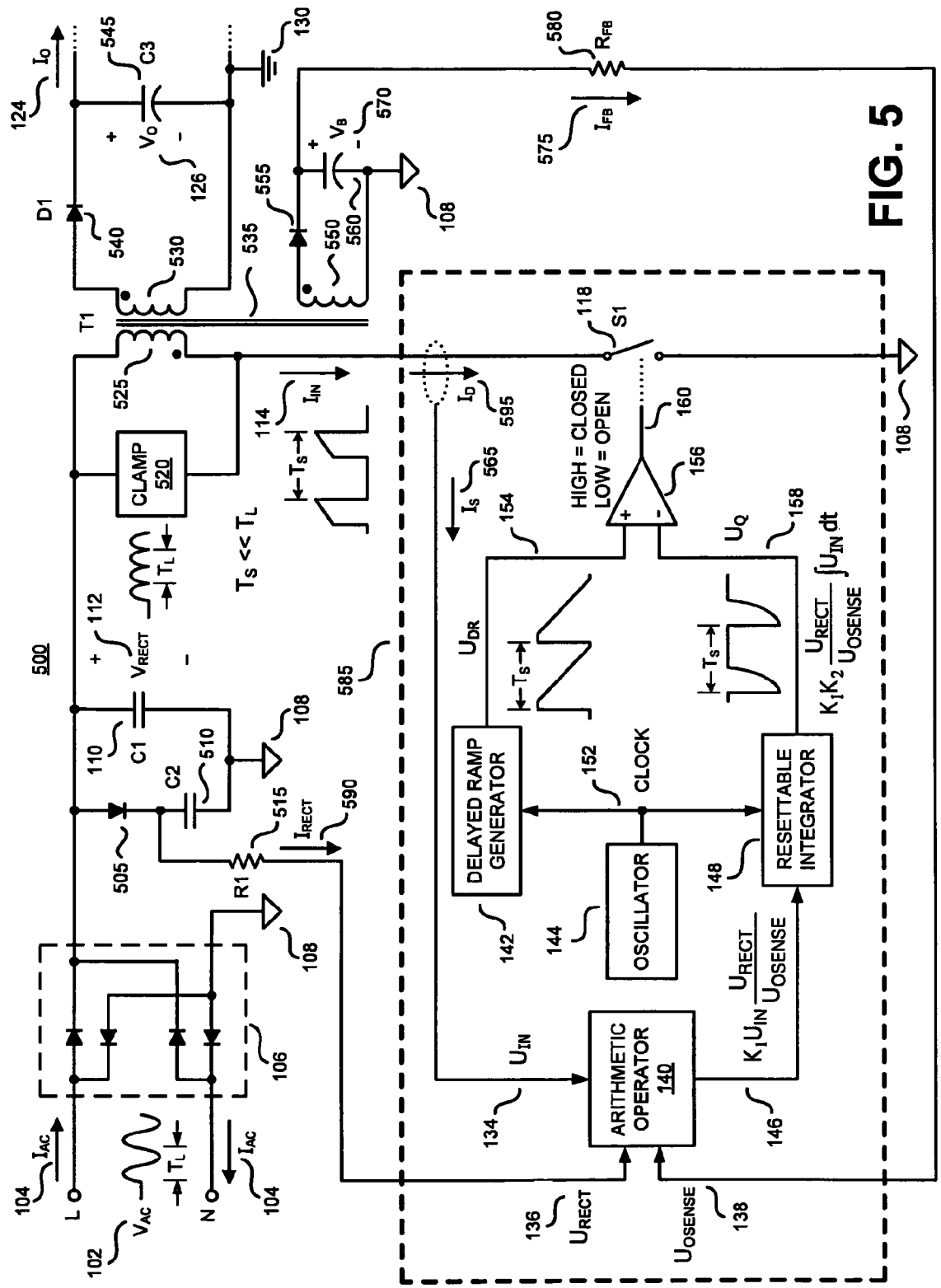
FIG. 5 is a functional block diagram illustrating an example ac-dc flyback power supply including an alternative controller that provides a high power factor while regulating an output current, in accordance with the teaching of the present invention.

FIG. 5 shows one example of an integrated circuit controller 585 in a power supply 500 that includes a particular dc-dc converter known as a flyback converter. The example flyback converter of FIG. 5 includes an energy transfer element that is a coupled inductor $T_1$ 535, sometimes referred to as a transformer. Coupled inductor $T_1$ 535 has a primary winding 525 that has one end coupled to the rectified input voltage $V_{RECT}$ 112. Coupled inductor $T_1$ 535 has a secondary winding 530 that has one end coupled to the output return 130. Coupled inductor $T_1$ 135 has a sense winding 550 that has one end coupled to the input return 108.

The example power supply 500 of FIG. 5 has switch S1 118 of the dc-dc converter included in an integrated circuit controller 585. Switch S1 118 in the example of FIG. 5 is coupled to one end of primary winding 525. Switch S1 118 opens and closes in response to a drive signal 160. In one example, switch S1 118 may be a metal oxide semiconductor field effect transistor (MOSFET). In another example, switch S1 118 may be a bipolar junction transistor (BJT). In yet another example, switch S1 118 may be an insulated gate bipolar transistor (IGBT). A clamp circuit 520 is coupled across the primary winding 525 to limit the voltage across primary winding 525 when switch S1 118 opens.

In the example power supply 500 of FIG. 5, controller 585 generates a drive signal 160 in response to an input voltage sense signal 136, an output voltage sense signal 138, and an input current sense signal 134. Any of the several ways practiced in the art to sense current in a switch may provide the current sense signal 134. In the example power supply of FIG. 5, input current sense signal 134 is a current $I_S$ 565 that is representative of the value of current $I_D$ 595 in switch S1 118. In the example power supply of FIG. 5, the current $I_D$ 595 is the same as the dc input current $I_{IN}$ 114 when switch S1 118 is closed.

Controller 585 in the example power supply 500 of FIG. 5 receives input voltage sense signal $U_{RECT}$ 136 as a current $I_{RECT}$ 590 that is representative of the peak value of the rectified input voltage $V_{RECT}$ 112. Capacitor C2 510 charges through diode 505 to the peak value of rectified voltage $V_{RECT}$ 112. Capacitor C2 510 discharges through resistor R1 515 at a rate that allows a negligible change in current $I_{RECT}$ 590 during half an ac line period $T_L$. Therefore, the example controller 585 in the example power supply 500 of FIG. 5 is responsive to the peak of rectified input voltage $V_{RECT}$ 112.

In the example power supply 500 of FIG. 5, the switching of switch S1 118 produces a pulsating current in secondary winding 530. The current in secondary winding 530 is rectified by diode D1 540 and filtered by capacitor C3 545 to produce a substantially dc output voltage $V_O$ 126 and an output current $I_O$ 135 provided to a load not shown in FIG. 5.

Coupled inductor $T_1$ 535 in the example power supply 500 of FIG. 5 includes a bias winding 550. Current in bias winding 550 is rectified by diode 555 and filtered by capacitor 570 to produce a substantially dc voltage $V_B$ 570 that is representative of output voltage $V_O$ 126.

Controller 585 in the example power supply 500 of FIG. 5 receives output voltage sense signal $U_{OSENSE}$ 138 as a feedback current $I_{FB}$ 575 through feedback resistor $R_{FB}$ 580 that is representative of output voltage $V_O$ 126. With these inputs described for input current sense signal $U_{IN}$ 134, input voltage sense signal $U_{RECT}$ 138, and output voltage sense signal $U_{OSENSE}$ 138, controller 585 in the example power supply 500 of FIG. 5 operates in the same way as the example controller 132 of FIG. 1.

Figure 6:
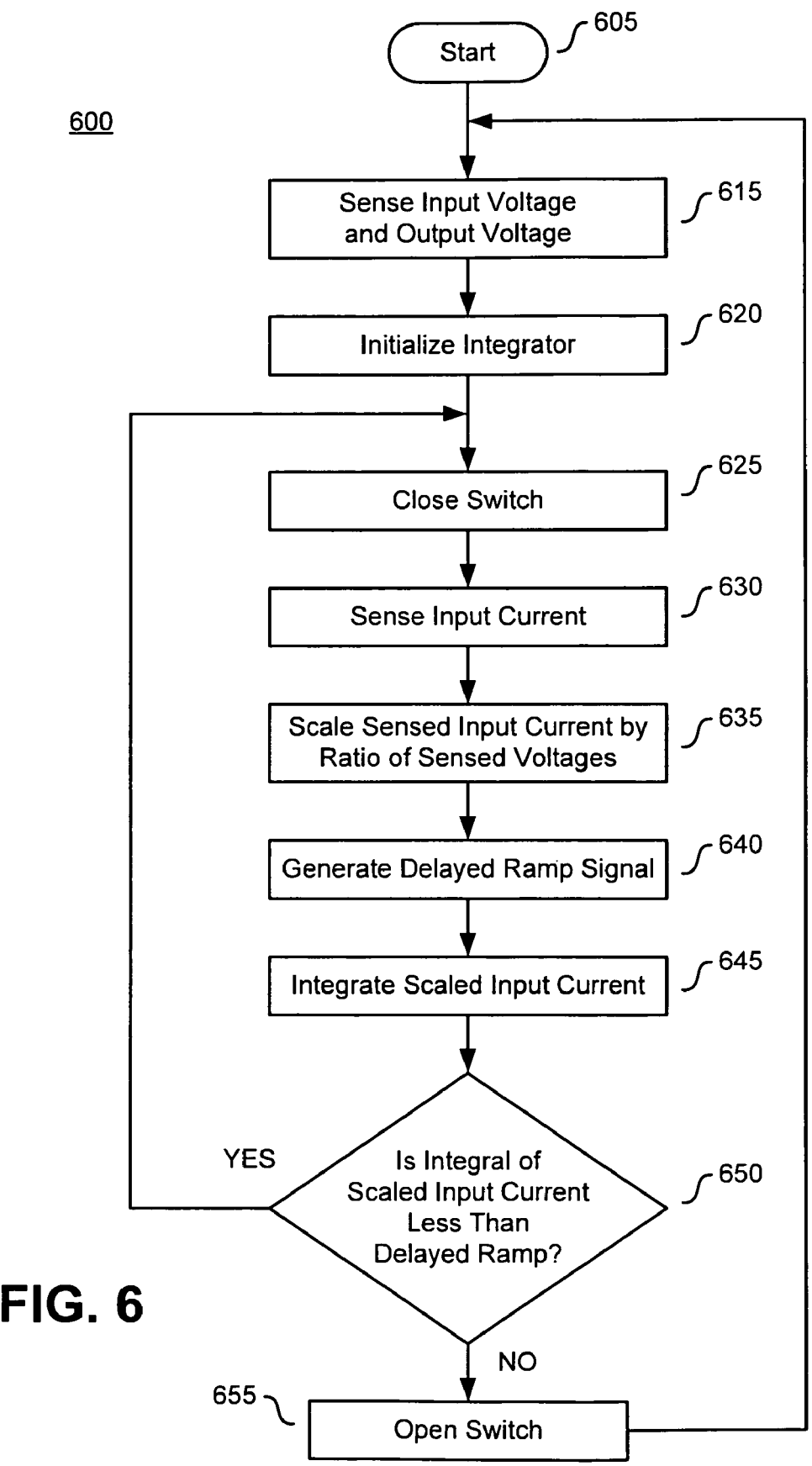
FIG. 6 is a flow diagram illustrating a method to control a single-stage ac-dc power supply that provides a high power factor while regulating an output current, in accordance with the present invention.

FIG. 6 is a flowchart 600 that describes a method to control a power supply to generate a high power factor with a regulated output current.

After starting in step 605, input voltage and output voltage are sensed in step 615. Step 620 sets the initial value for an integration step. Next, a switch is closed in step 625 allowing input current to flow. While the switched is closed, the input current is sensed in step 630. The sensed input current is scaled by the ratio of sensed input voltage to sensed output voltage in step 635. A delayed ramp signal is generated in step 640.

The scaled input current is integrated in step 645. The integral of the scaled input current is compared to the delayed ramp in step 650. If the integral of the scaled input current is less than the delayed ramp signal, then the input current is allowed to continue to flow and the integration continues in steps 625 through 650. If the integral of the scaled input current is not less than the delayed ramp signal, then the input current is terminated in step 655, and the process continues to step 615.

What is claimed is:

1. A power supply controller comprising:
   a first input to be coupled to receive an input voltage sense signal representative of a dc input voltage of the power supply;
   a second input to be coupled to receive an output voltage sense signal representative of a dc output voltage of the power supply;
   a third input to be coupled to receive an input current sense signal representative of an input current of the power supply;
   a delayed ramp generator coupled to generate a delayed ramp signal;
   an input charge control signal generator coupled to generate an input charge control signal responsive to an integral of the input current sense signal and a ratio of the input voltage sense signal to the output voltage sense signal; and
   a drive signal generator coupled to receive the delayed ramp signal and the input charge control signal and to regulate an output of the power supply, wherein the drive signal generator produces a drive signal responsive to the input charge control signal and the delayed ramp signal, the drive signal to be coupled to control a switch of the power supply.

2. The controller of claim 1, wherein the delayed ramp signal includes a plurality of piecewise linear segments.

3. The controller of claim 2, wherein the plurality of piecewise linear segments includes a first segment of substantially zero slope followed by a second segment having a finite linear slope.

4. The controller of claim 1, further comprising an oscillator coupled to generate a clock signal, wherein the delayed ramp signal is generated responsive to the clock signal.

5. The controller of claim 1, wherein the input charge control signal generator further comprises an integrator coupled to integrate the input current sense signal to generate an input charge signal.

6. The controller of claim 5, wherein the input charge control signal generator further comprises an arithmetic operator circuit coupled to multiply, divide or scale the input voltage sense signal, the output voltage sense signal and the input charge signal to generate the input charge control signal.

7. The controller of claim 1, wherein the input charge control signal generator further comprises an arithmetic operator circuit coupled to multiply, divide or scale the input voltage sense signal, the output voltage sense signal and the input current sense signal to generate a scaled current signal that is responsive to the input current sense signal multiplied by the ratio of the input voltage sense signal to the output voltage sense signal.

8. The controller of claim 7, wherein the scaled current signal is a product of the input current sense signal multiplied by the ratio of the input voltage sense signal to the output voltage sense signal, the product further multiplied by a scaling factor.

9. The controller of claim 7, wherein the input charge control signal generator further comprises an integrator coupled to integrate the scaled current signal to generate the input charge control signal.

10. The controller of claim 1, wherein the drive signal generator produces the drive signal to be coupled to control the switch of the power supply to regulate an output current of the power supply.

11. The controller of claim 1, wherein the switch and the controller are integrated into a single monolithic integrated device.

12. A power supply controller comprising:
    a first input to be coupled to receive an input voltage sense signal representative of a dc input voltage of the power supply;
    a second input to be coupled to receive an output voltage sense signal representative of a dc output voltage of the power supply;
    a third input to be coupled to receive an input current sense signal representative of an input current of the power supply;
    a delayed ramp generator coupled to generate a delayed ramp signal;
    an integrator coupled to integrate the input current sense signal to generate an input charge signal;

an arithmetic operator circuit coupled to generate an input charge control signal responsive to the input charge signal and a ratio of the input voltage sense signal to the output voltage sense signal; and a drive signal generator coupled to receive the delayed ramp signal and the input charge control signal and to regulate an output of the power supply, wherein the drive signal generator produces a drive signal responsive to the input charge control signal and the delayed ramp signal, the drive signal to be coupled to control a switch of the power supply.

13. The controller of claim 12, wherein the delayed ramp signal includes a plurality of piecewise linear segments.

14. The controller of claim 13, wherein the plurality of piecewise linear segments includes a first segment of substantially zero slope followed by a second segment having a finite linear slope.

15. The controller of claim 12, further comprising an oscillator coupled to generate a clock signal, wherein the delayed ramp signal is generated responsive to the clock signal.

16. The controller of claim 12, wherein the drive signal generator produces the drive signal to be coupled to control the switch of the power supply to regulate an output current of the power supply.

17. The controller of claim 12, wherein the switch and the controller are integrated into a single monolithic integrated device.

18. A power supply controller comprising:

a first input to be coupled to receive an input voltage sense signal representative of a dc input voltage of the power supply;

a second input to be coupled to receive an output voltage sense signal representative of a dc output voltage of the power supply;

a third input to be coupled to receive an input current sense signal representative of an input current of the power supply;

a delayed ramp generator coupled to generate a delayed ramp signal;

an arithmetic operator coupled to generate a scaled current signal that is responsive to input current sense signal and a ratio of the input voltage sense signal to the output voltage sense signal;

an integrator coupled to integrate the scaled current signal to generate an input charge control signal; and a drive signal generator coupled to receive the delayed ramp signal and the input charge control signal and to regulate an output of the power supply, wherein the drive signal generator produces a drive signal responsive to the input charge control signal and the delayed ramp signal, the drive signal to be coupled to control a switch of the power supply.

19. The controller of claim 18, wherein the delayed ramp signal includes a plurality of piecewise linear segments.

20. The controller of claim 19, wherein the plurality of piecewise linear segments includes a first segment of substantially zero slope followed by a second segment having a finite linear slope.

21. The controller of claim 18, further comprising an oscillator coupled to generate a clock signal, wherein the delayed ramp signal is generated responsive to the clock signal.

22. The controller of claim 18, wherein the scaled current signal is a product of the input current sense signal multiplied by the ratio of the input voltage sense signal to the output voltage sense signal, the product further multiplied by a scaling factor.

23. The controller of claim 18, wherein the drive signal generator produces the drive signal to be coupled to control the switch of the power supply to regulate an output current of the power supply.

24. The controller of claim 18, wherein the switch and the controller are integrated into a single monolithic integrated device.

* * * * *